United States Patent
Lee et al.

(10) Patent No.: US 8,072,665 B2
(45) Date of Patent: Dec. 6, 2011

(54) THREE-DIMENSIONAL SPACE SCANNER

(75) Inventors: Back Kue Lee, Gyunggi-do (KR); Gil Han Park, Gyunggi-so (KR); Hong Ki Kim, Gyunggi-do (KR); Kwang Youel Raa, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 124 days.

(21) Appl. No.: 12/561,650

(22) Filed: Sep. 17, 2009

(65) Prior Publication Data

US 2010/0118362 A1 May 13, 2010

(30) Foreign Application Priority Data

Nov. 11, 2008 (KR) .................. 10-2008-0111888

(51) Int. Cl.
*G02B 26/08* (2006.01)

(52) U.S. Cl. .................................... 359/200.1

(58) Field of Classification Search .... 359/198.1–200.4, 359/871, 872
See application file for complete search history.

(56) References Cited

U.S. PATENT DOCUMENTS 4,499,490 A * 2/1985 Morgan .......................... 348/37

FOREIGN PATENT DOCUMENTS

| | | |
|---|---|---|
| JP | 09-131691 | 5/1997 |
| JP | 10-020035 | 1/1998 |
| KR | 0132992 | 1/1999 |

OTHER PUBLICATIONS

Korean Office Action, w/ English translation thereof, issued in Korean Patent Application No. KR 10-2008-0111888 dated Dec. 14, 2010.

* cited by examiner

*Primary Examiner* — Euncha Cherry
(74) *Attorney, Agent, or Firm* — McDermott Will & Emery LLP

(57) ABSTRACT

A three-dimensional space scanner is configured so that a reflecting mirror is rotated and tilted so as to scan a mobile object in a horizontal as well as vertical direction, thereby obtaining spatial data.

16 Claims, 9 Drawing Sheets

THREE-DIMENSIONAL SPACE SCANNER

CROSS-REFERENCE TO RELATED APPLICATIONS

This application claims the priority of Korean Patent Application No. 2008-0111888, filed on Nov. 11, 2008, in the Korean Intellectual Property Office, the disclosure of which is incorporated herein by reference.

BACKGROUND OF THE INVENTION

1. Field of the Invention

The present invention relates to a three-dimensional space scanner, and more particularly, to a three-dimensional space scanner, in which a reflecting mirror is rotated and tilted so as to scan a mobile object in a horizontal as well as vertical direction, thereby obtaining spatial data.

2. Description of the Related Art

An autonomous mobile (walking) device such as a mobile robot senses a surrounding object and measures a distance from the object using a laser beam, supersonic waves or the like in order to locate its position and determine a moving direction.

Laser range finding is known as a most accurate method for measuring the distance to an object, particularly, by sensing a laser beam reflecting from the object and measuring the time taken for the laser beam to travel to the object and back.

A conventional autonomous mobile device adopting such a laser range finding technique scans a surrounding space using laser beams emitted directly along a two-dimensional horizontal plane. Accordingly, the autonomous mobile device can sense surrounding objects and measure distances from the objects only if the objects are located at a specific height corresponding to a laser emitter.

That is, sensible objects are limited to those onto which the laser beams are emitted and to those which are located at the same horizontal plane of the laser emitter. Thus, it is impossible to scan other ranges and distance information on only a specific horizontal plane can be obtained.

However, while consumer demands on autonomous mobile devices capable of performing more accurate drive and more various operations are increasing, the distance information only on a specific horizontal plane cannot sufficiently ensure safety and functionality.

SUMMARY OF THE INVENTION

An aspect of the present invention is to provide a three-dimensional space scanner, which scans a mobile object in a horizontal as well as vertical direction so as to detect a distance from a surrounding obstacle, thereby obtaining spatial data.

According to an aspect of the present invention, there is provided a three-dimensional space scanner, which includes a rotating drive generating a rotating force; a mirror holder tiltably supporting a reflecting mirror and rotated by the rotating force of the rotating drive; and a tilting drive disposed above the mirror holder, wherein the tilting drive vertically reciprocates along a frame and tilts the reflecting mirror connected via a rod.

The rod may be hinged with a first end of the reflecting mirror, and the reflecting mirror may be tilted depending on a vertical displacement of the tilting drive.

The reflecting mirror may have a tilting range determined by a vertical displacement of the rod.

The tilting drive may include an outer plate having a through-hole in a center thereof, wherein the outer plate vertically reciprocates along a guide slot of the frame; an inner plate having a through-hole in a center thereof, which allows a laser beam to pass through, and rotatably inserted into the through-hole of the outer plate; and the rod hinged with the inner plate at one end thereof and the reflecting mirror at the other end thereof.

The inner plate and the rod may be rotated in the through-hole of the outer plate, and vertically reciprocate along with the outer plate.

According to another aspect of the present invention, there is provided a three-dimensional space scanner, which includes a rotating drive generating a rotating force; a mirror holder tiltably supporting a reflecting mirror and rotated by the rotating force of the rotating drive; a cam having a guide groove in an outer circumferential surface thereof and rotatably disposed above the mirror holder; and a tilting drive connected with the guide groove, wherein the tilting drive vertically reciprocates along a path of the guide groove and tilts the reflecting mirror connected via a rod.

The three-dimensional space scanner may further include a cam motor providing a driving force for rotating the cam.

The three-dimensional space scanner may further include a frame supporting the rotating drive, the mirror holder, the cam, and the tilting drive.

The rod may be hinged with one end of the reflecting mirror, and the reflecting mirror may be tilted depending on a vertical displacement of the tilting drive.

The reflecting mirror may have a tilting range determined by a vertical displacement of the rod.

The tilting drive may include a guide having a cam follower on an inner circumferential surface thereof which is fitted into the guide groove, wherein the guide vertically reciprocates along a path of the guide groove; a plate having a through-hole in a center thereof, which allows a laser beam to pass through, and rotatably coupled with the guide; and the rod hinged with the plate at one end thereof and the reflecting mirror at the other end thereof.

The plate may be rotatably inserted into a groove recessed along an inner circumferential surface of a lower end of the guide.

The guide may have a cylindrical structure in which an inner diameter thereof is greater than an outer diameter of the cam, and vertically reciprocate along a length of the cam.

The rod may vertically reciprocate to tilt the reflecting mirror.

According to the present invention, the three-dimensional space scanner can rotate and tilt the reflecting mirror so as to three-dimensionally scan a mobile object in a horizontal as well as vertical direction using a laser beam, thereby detecting a distance from a surrounding obstacle to obtain three-dimensional spatial data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EXEMPLARY EMBODIMENTS

Exemplary embodiments of a three-dimensional space scanner according to the present invention will now be described in detail with reference to the accompanying drawings.

Figure 1:
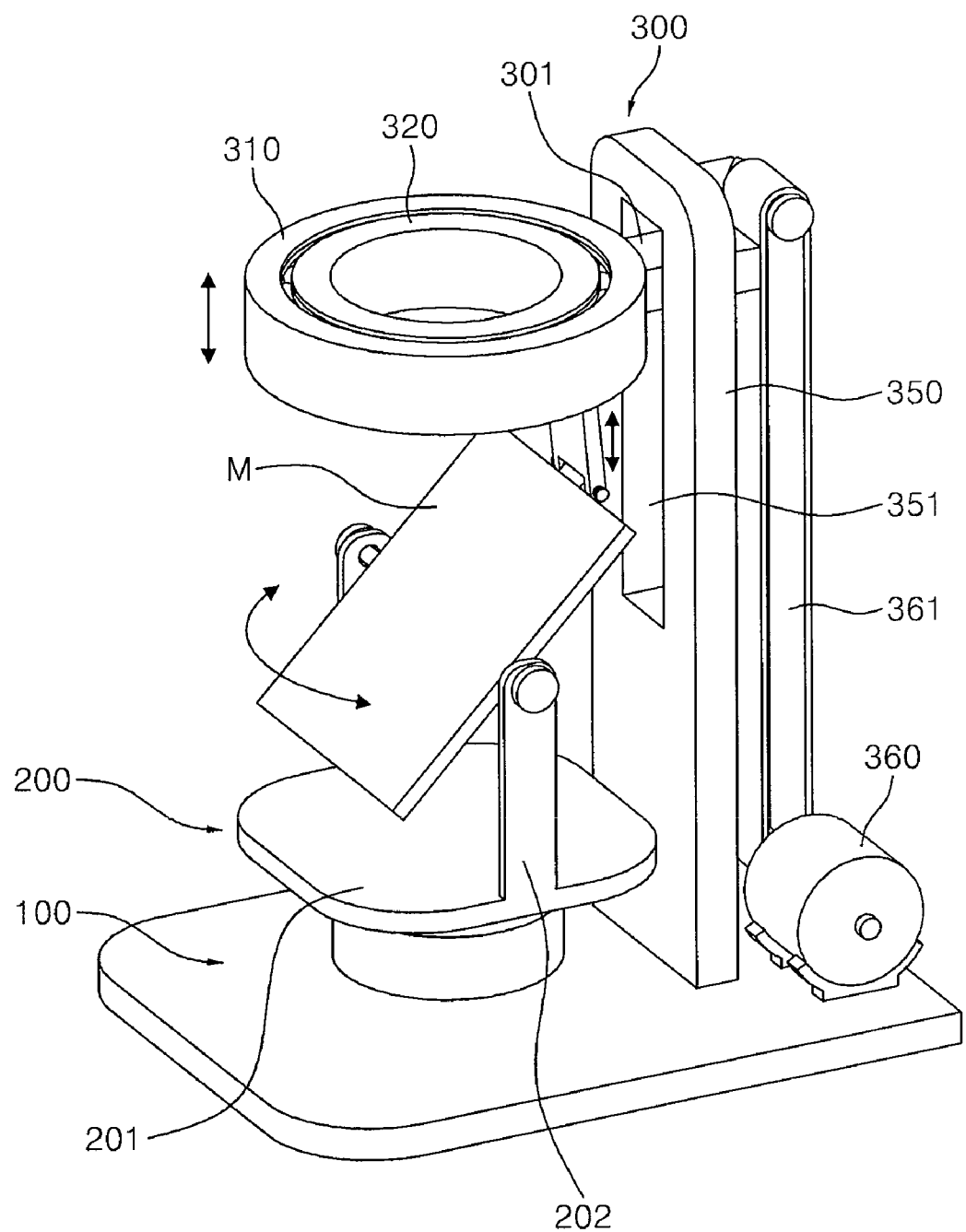
FIG. 1 is a perspective view illustrating a three-dimensional space scanner according to a first embodiment of the present invention.
Figure 2:
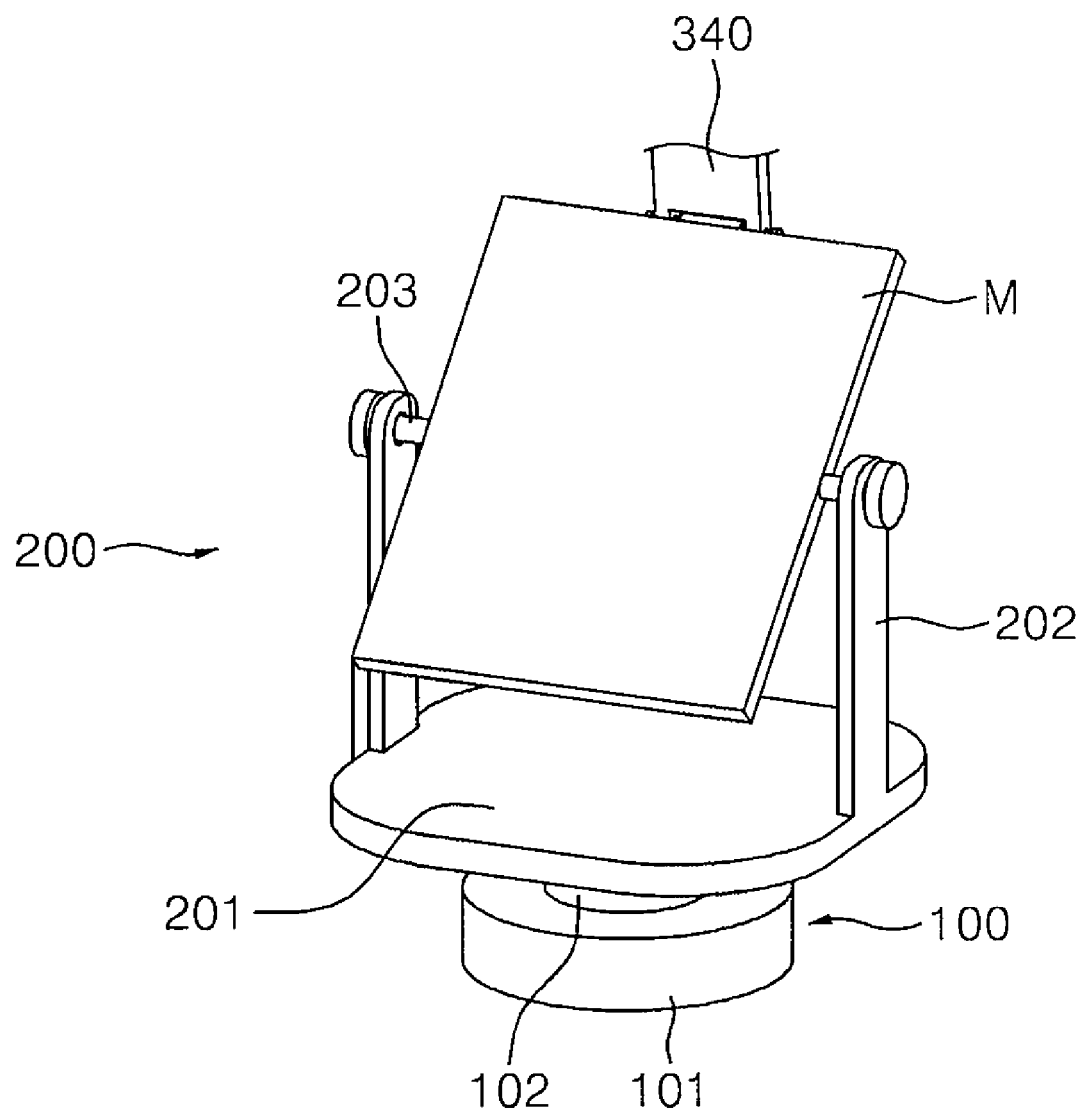
FIG. 2 is a perspective view illustrating a rotating drive and a mirror holder for the three-dimensional space scanner illustrated in FIG. 1.
Figure 3A:
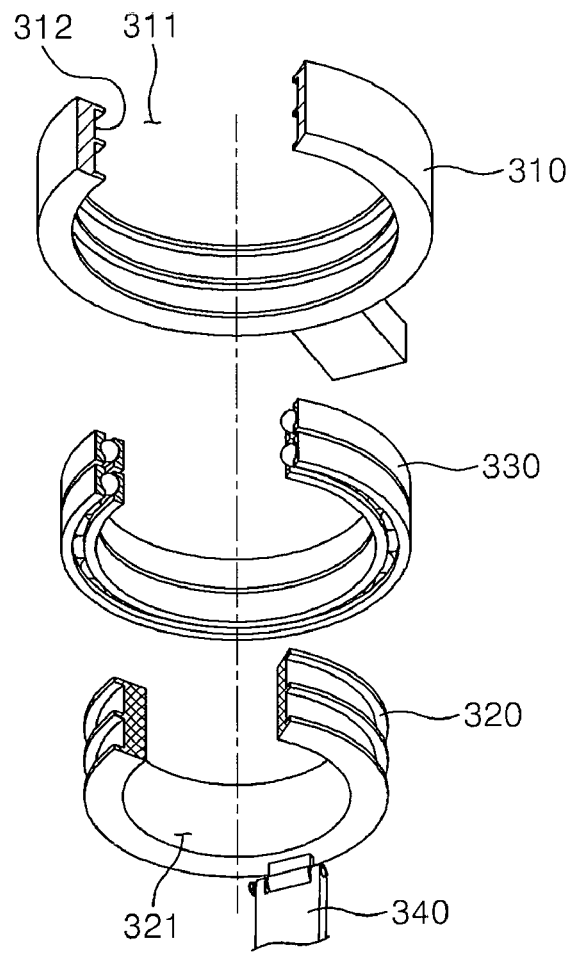
FIGS. 3A and 3B are perspective views illustrating a tilting drive for the three-dimensional space scanner illustrated in FIG. 1.
Figure 3B:
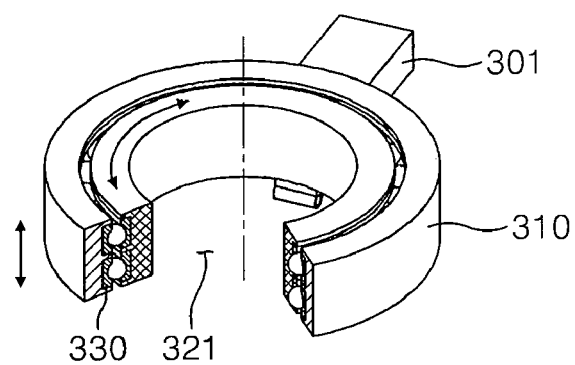

FIG. 1 is a perspective view illustrating a three-dimensional space scanner according to a first embodiment of the present invention. FIG. 2 is a perspective view illustrating a rotating drive and a mirror holder for the three-dimensional space scanner illustrated in FIG. 1. FIGS. 3A and 3B are perspective views illustrating a tilting drive for the three-dimensional space scanner illustrated in FIG. 1.

As illustrated in FIG. 1, the three-dimensional space scanner according to a first embodiment of the present invention includes a rotating drive 100, a mirror holder 200, and a tilting drive 300.

In the three-dimensional space scanner, the rotating drive 100 is for generating a rotating force for continuously rotating a reflecting mirror M at an angle of 360° in a horizontal direction, and is provided with a rotating motor 101 on a lower side thereof which rotates a vertical rotating shaft 102 when powered. The rotating motor 101 can be installed in a case for protection.

The vertical rotating shaft 102 is connected with the rotating motor 101 at one end thereof, and the mirror holder 200 at the other end thereof, and transmits the rotating force of the rotating motor 101 to the mirror holder 200.

Meanwhile, the mirror holder 200 is a rotating member that is connected with the vertical rotating shaft 102 and is rotated in a predetermined direction by the rotating force of the rotating drive 100.

As illustrated, the mirror holder 200 includes a horizontal table 201, to the center of which the vertical rotating shaft 102 is substantially connected, and vertical rods 202 extending from left-hand and right-hand ends of the horizontal table 201 in a direct upward direction, and has an angled U-shaped overall configuration.

The mirror holder 200 is configured therein so that the reflecting mirror M can be tilted about a horizontal rotating shaft 203 connected to the left-hand and right-hand vertical rods 202.

In detail, the reflecting mirror M is pivotably connected to the horizontal rotating shaft 203, which crosses the mirror holder 200 and is connected to the vertical rods 202 of the mirror holder 200. Thereby, the reflecting mirror M is constructed to be tilted at various angles without being fixed at a specific angle alone.

This reflecting mirror M reflects a laser beam emitted from a laser (not shown) to the surrounding area of an autonomous mobile apparatus, receives the laser beam reflected from an obstacle, and reflects the received laser beam to a photodetector (not shown) again.

Thus, the reflecting mirror M continuously rotates along with the mirror holder 200 at a predetermined speed, and can carry out continuous scanning along the surrounding area of the autonomous mobile apparatus within the angle of 360°.

Further, since the reflecting mirror M is tilted within a range of various angles without being fixed at an angle of 45° so as to carry out vertical scanning, the reflecting mirror M can obtain two-dimensional distance data for a horizontal distance according to a specific height as in the related art, as well as three-dimensional space data including a vertical distance in addition to the horizontal distance.

Meanwhile, the tilting drive 300 is disposed above the mirror holder 200, reciprocates along a frame 350 in a vertical direction, and tilts the reflecting mirror M hinged to a rod 340.

Figure 4A:
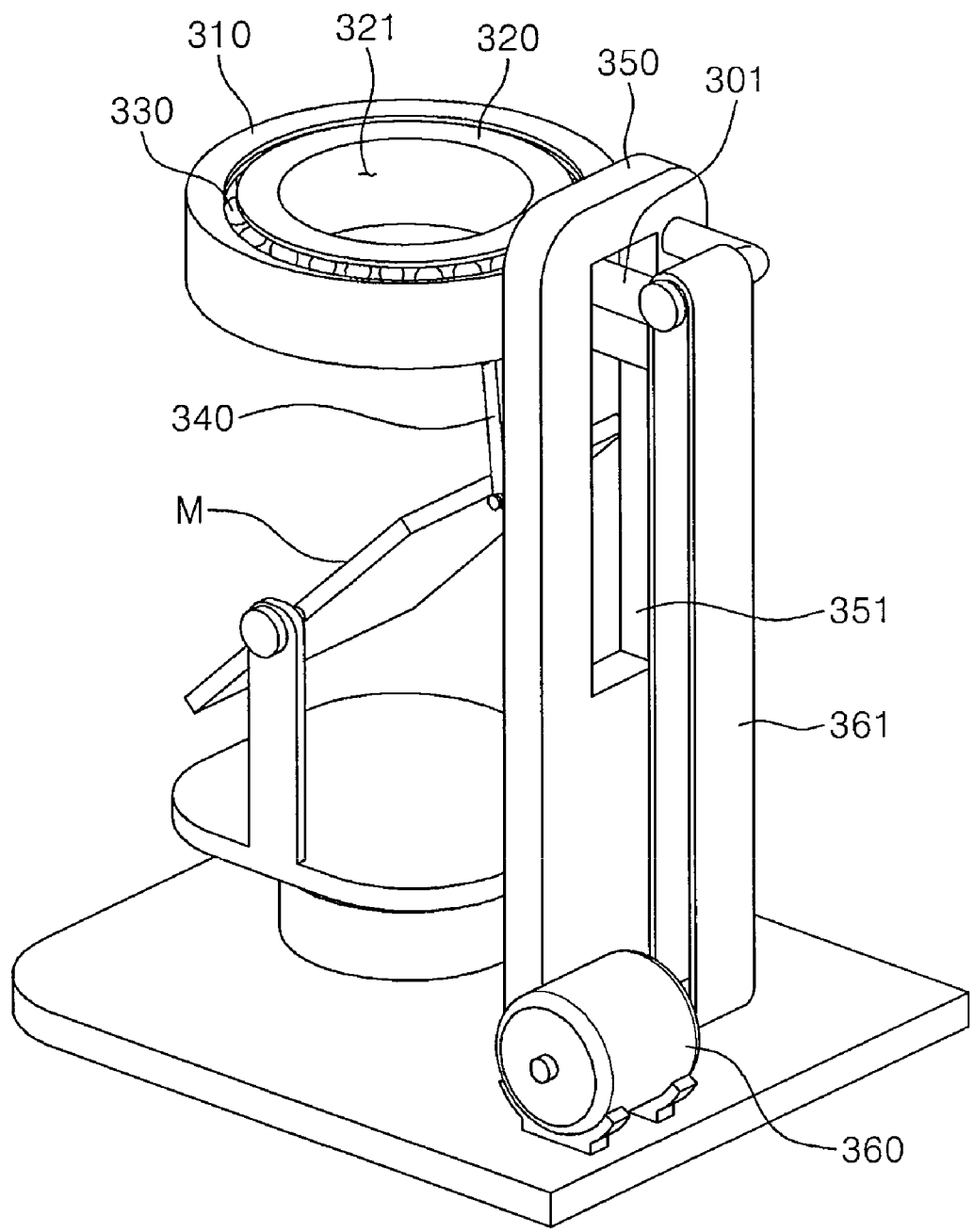
FIG. 4A is a perspective view illustrating a driving motor driving a tilting drive for the three-dimensional space scanner illustrated in FIG. 1.
Figure 4B:
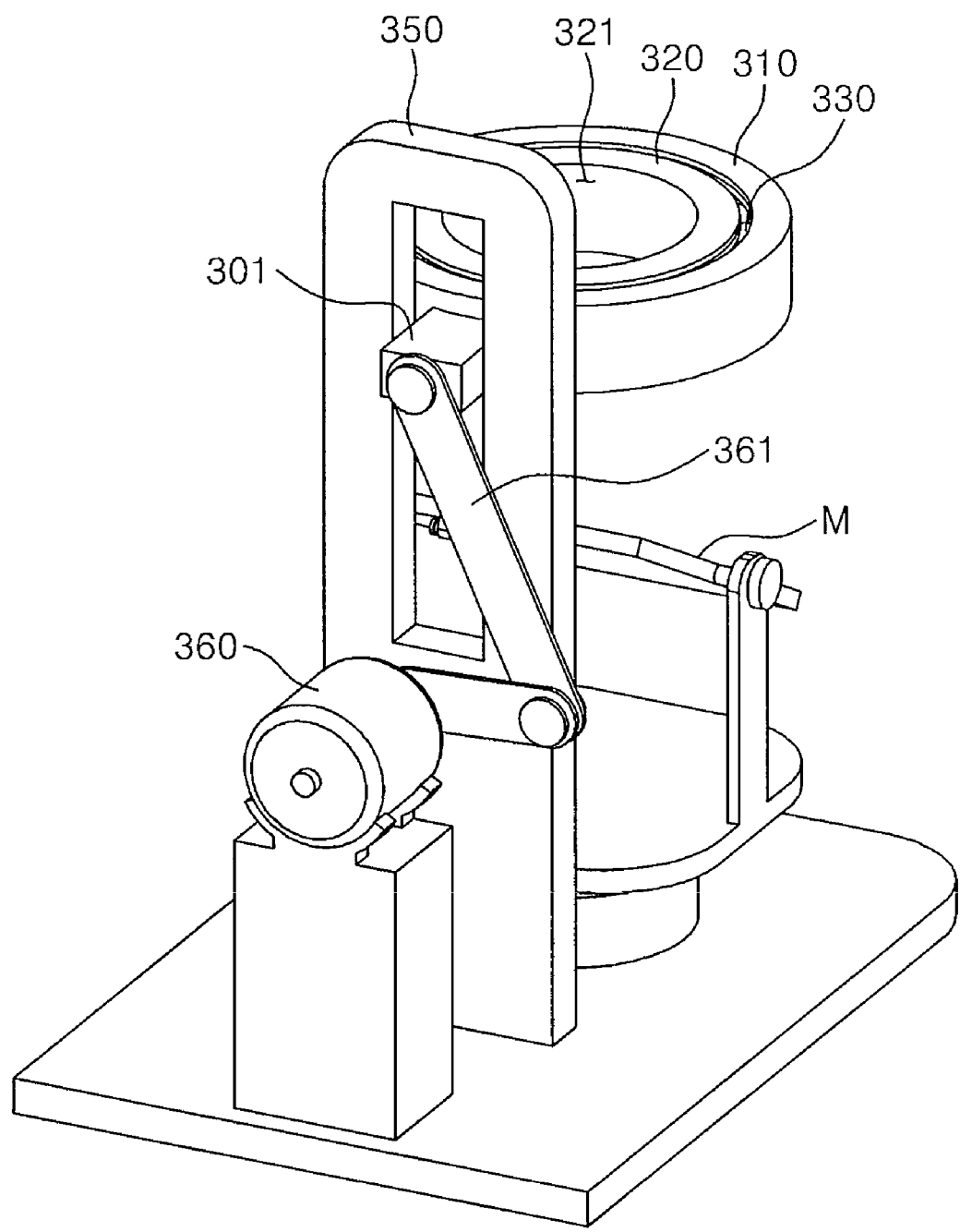
FIG. 4B is a perspective view illustrating another driving motor driving a tilting drive for the three-dimensional space scanner illustrated in FIG. 1.

As illustrated in FIGS. 3, 4A, 4B, the tilting drive 300 includes an outer plate 310, an inner plate 320, and a rod 340.

The outer plate 310 is connected with and supported in the frame 350 through a shaft 301 provided on an outer circumferential surface thereof, and vertically reciprocates along a guide slot 351 of the frame 350.

The outer plate 310 is provided with a through-hole 311 in the center thereof, and at least one groove 312 in an inner circumferential surface thereof.

The inner plate 320 is rotatably inserted into the through-hole 311 of the outer plate 310.

For smooth rotation of the inner plate 320, a bearing 330 is installed between the groove 312 and an outer circumferential surface of the inner plate 320.

The inner plate 320 is provided with a through-hole 321 in the center thereof such that the laser beam emitted from the laser (not shown) can pass through the through-hole 321 and be reflected by the reflecting mirror M.

The rod 340 is hinged with the inner plate 320 at one end thereof, and the reflecting mirror M at the other end thereof such that the reflecting mirror M is tilted depending on a vertical displacement of the tilting drive 300.

Particularly, since a tilting range of the reflecting mirror M is determined by the vertical displacement of the rod 340, the tilting range of the reflecting mirror M can be freely adjusted by adjustment of the vertical displacement of the rod 340.

In this manner, the inner plate 320 and the rod 340 are rotated in the through-hole 311 of the outer plate 310 along with the reflecting mirror M connected with the rod 340, and reciprocate along with the outer plate 310, thereby tilting the reflecting mirror M.

The frame 350 supporting the outer plate 310 such that the tilting drive is disposed above the reflecting mirror M at a predetermined height is provided with a driving motor 360 reciprocating the outer plate 310.

As illustrated in FIG. 4A, the driving motor 360 is connected with the outer plate 310 through a belt 361 or a chain so as to move the outer plate 310.

However, as illustrated in FIG. 4B, the driving motor 360 can also be connected with the outer plate 310 through a linkage.

A structure in which the reflecting mirror can be rotated and tilted will be described with reference to FIGS. 5A through 5C.

Figure 5A:
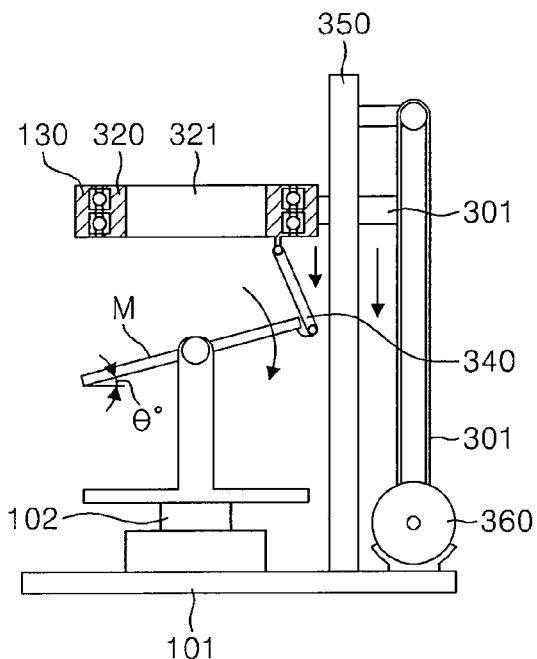
FIG. 5A to 5C are schematic views illustrating step-by-step operation of the three-dimensional space scanner illustrated in FIG. 1.
Figure 5B:
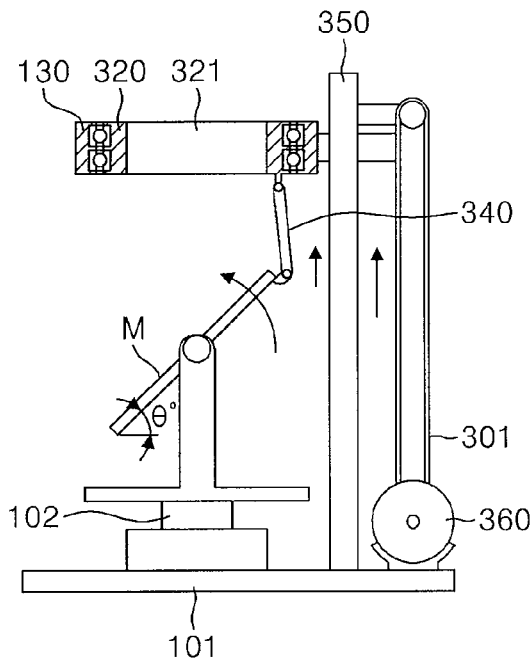
Figure 5C:
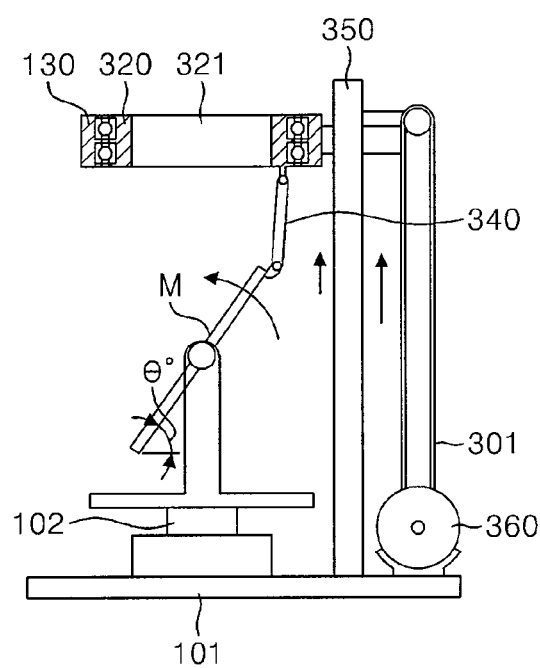

FIGS. 5A through 5C are schematic views illustrating step-by-step operation of the three-dimensional space scanner illustrated in FIG. 1.

As illustrated in FIG. 5A, when the outer plate 310 moves downward along the guide slot of the frame 350, and then is located at the lowermost position of a moving path of the tilting drive 300, the reflecting mirror M is pushed in a downward direction by the rod 340, so that the reflecting mirror M has a gradient θ of 45° or less with respect to a horizontal plane.

Next, as illustrated in FIG. 5B, when the outer plate 310 moves upward along the guide slot of the frame 350, and then is located at an intermediate position of the moving path of the tilting drive 300, the reflecting mirror M is pushed in an upward direction by the rod 340, so that the reflecting mirror M has a gradient θ of about 45° with respect to a horizontal plane.

Finally, as illustrated in FIG. 5C, when the outer plate 310 further moves upward along the guide slot of the frame 350, and then is located at the uppermost position of the moving path of the tilting drive 300, the reflecting mirror M is further pushed in an upward direction by the rod 340, so that the reflecting mirror M has a gradient θ of 45° or more with respect to a horizontal plane.

The lowermost and uppermost positions of the tilting drive 300 can be adjusted according to the tilting range of the reflecting mirror. Thus, the lowermost and uppermost positions of the tilting drive 300 are determined so as to be located above the mirror holder 200 such that the tilting drive 300 does not move below the mirror holder 200.

This tilting motion of the reflecting mirror M is repeatedly performed by the vertical reciprocation of the tilting drive 300 within a gradient range of 0°<θ<90°. The gradient range can be adjusted by adjusting a length of the rod 340.

Further, the rotation of the reflecting mirror M can be synchronized with the continuous rotation of the vertical rotating shaft 102.

Figure 6:
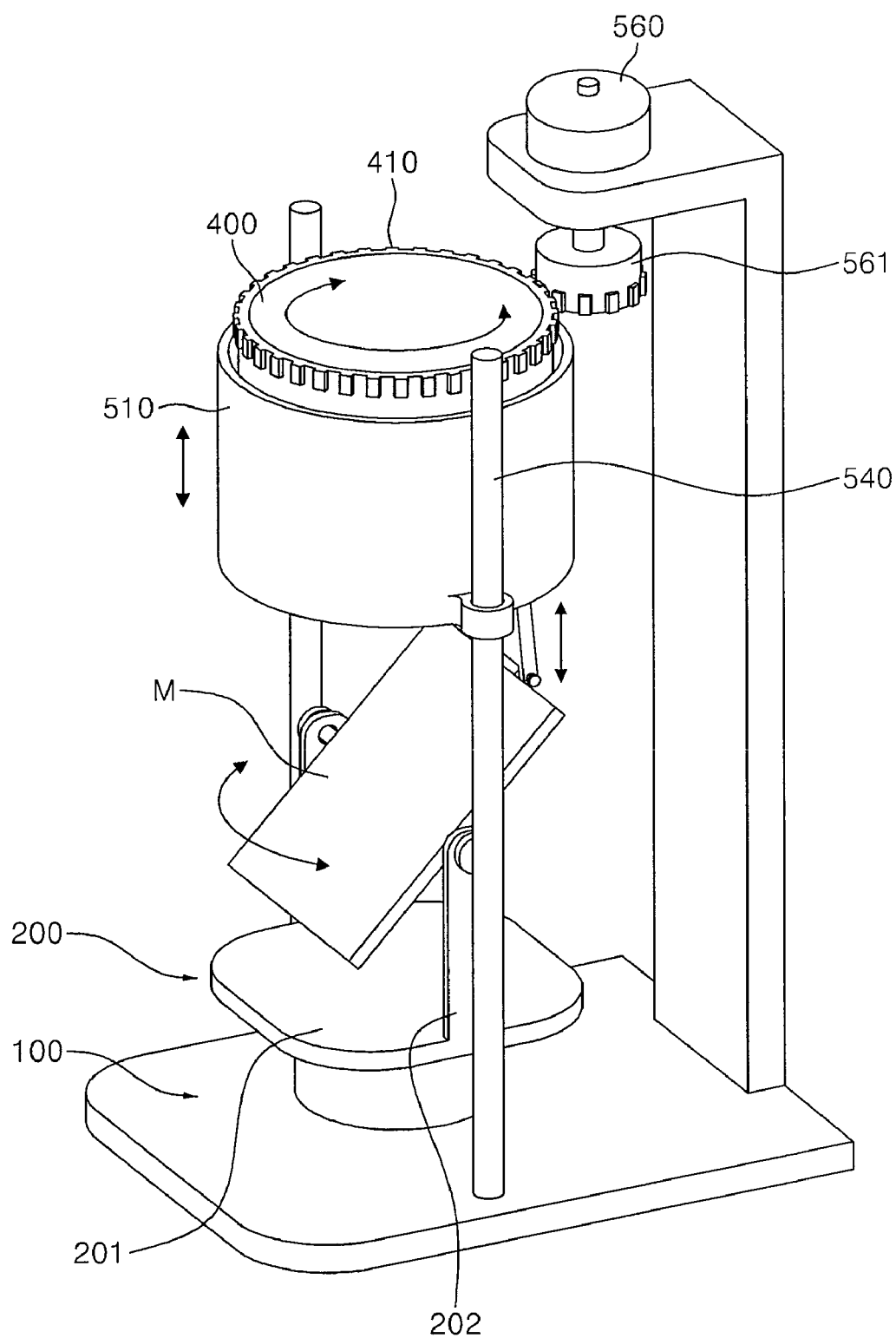
FIG. 6 is a perspective view illustrating a three-dimensional space scanner according to a second embodiment of the present invention.

FIG. 6 is a perspective view illustrating a three-dimensional space scanner according to a second embodiment of the present invention.

The three-dimensional space scanner according to a second embodiment of the present invention as illustrated in FIG. 6 is substantially the same configuration as that according to a embodiment of the present invention as illustrated in FIGS. 1 through 5C.

However, in conjunction with detailed configuration of the tilting drive, the second embodiment of the present invention as illustrated in FIGS. 6 through 8C is different from the first embodiment of the present invention as illustrated in FIGS. 1 through 5C. Therefore, the following description will be mainly made of the configuration and operation of the tilting drive but a description of the same parts will be omitted.

As illustrated in FIG. 6, the three-dimensional space scanner according to a second embodiment of the present invention includes a rotating drive 100, a mirror holder 200, a cam 400, and a tilting drive 500.

The rotating drive 100 includes a rotating motor 101 rotated when powered, and a vertical rotating shaft 102, and transmits a rotating force of the rotating motor 101 to the mirror holder 200 through the vertical rotating shaft 102.

The mirror holder 200 is configured therein so that a reflecting mirror M can be tilted, and thus is continuously rotated through the vertical rotating shaft 102.

Figure 7A:
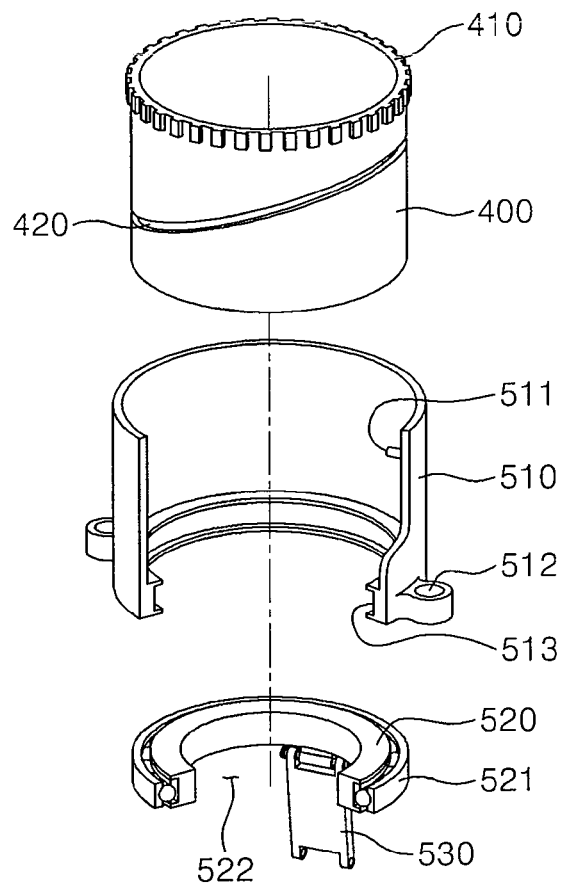
FIG. 7A and 7B are perspective views illustrating a driving motor driving a tilting drive for the three-dimensional space scanner illustrated in FIG. 6.
Figure 7B:
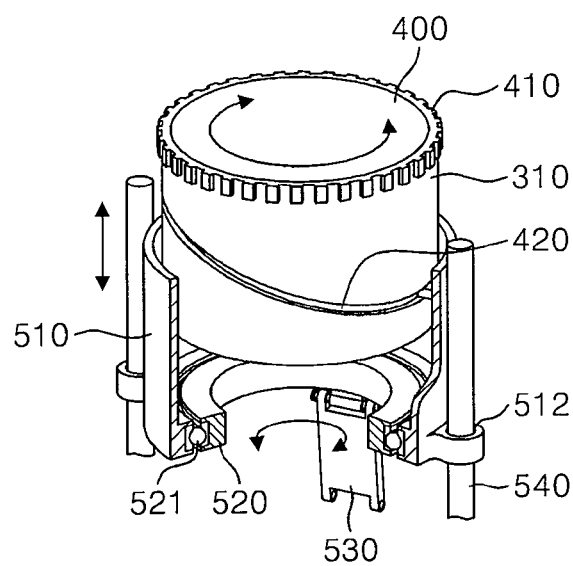

As illustrated in FIGS. 7A and 7B, the cam 400 is provided for vertical reciprocation of the tilting drive 500, and is includes a guide groove 420 recessed in an outer circumferential surface thereof, and is rotatably disposed above the mirror holder 200.

As illustrated in FIG. 6, the cam 400 is provided with a gear 410 on an upper, outer circumferential surface thereof which is engaged with the rotating shaft of a cam motor 561. Thus, the cam motor 561 provides a driving force for rotating the cam 400. However, the cam motor 561 may provide the driving force through a chain.

The tilting drive 500 is connected with the guide groove 420 of the cam 400, vertically reciprocates along a path of the guide groove 420, and tilts the reflecting mirror M hinged to a rod 530.

As illustrated in FIG. 7B, the tilting drive 500 includes a guide 510, a plate 520 and a rod 530.

The guide 510 is a cylindrical member that has a cam follower 511 fitted into the guide groove 420 on an inner circumferential surface thereof and vertically reciprocates along the path of the guide groove 420 when the cam 400 is rotated.

As illustrated, the guide 510 is configured so that an inner diameter thereof is greater than an outer diameter of the cam 400, and vertically reciprocates along the outer circumferential surface of the cam 400.

Thus, when the cam 400 is rotated, the cam follower 511 fitted into the guide groove 420 moves along the path of the guide groove 420 in an upward or downward direction such that the guide 510 vertically reciprocates.

A vertical displacement of the guide 510 can be adjusted by adjusting a size of the cam 400 and a length of the path of the guide groove 420.

The guide 510 is connected with a pair of guide rods 540, which guides the guide 510 so as to be able to vertically reciprocate along a predetermined path.

Meanwhile, the plate 520 is rotatably connected with the guide 510 so as to vertically reciprocate along with the guide 510.

As illustrated, the plate 520 is rotatably inserted into a groove 513 recessed along the inner circumferential surface of a lower end of the guide 510. A bearing 521 is interposed between the groove 513 and the outer circumferential surface of the plate 520 for the purpose of smooth rotation.

The plate 520 is provided with a through-hole 522 in the center thereof such that a laser beam emitted from a laser (not shown) can pass through the through-hole 522 and be reflected by the reflecting mirror M.

Meanwhile, the rod 530 is hinged with the plate 520 at one end thereof, and the reflecting mirror M at the other end thereof such that the reflecting mirror M is tilted depending on the vertical displacement of the tilting drive 500.

Particularly, since a tilting range of the reflecting mirror M is determined by the vertical displacement of the rod 530, the tilting range of the reflecting mirror M can be freely adjusted by adjustment of the vertical displacement of the rod 530.

In this manner, the inner plate 520 and the rod 530 are rotated inside the guide 510 along with the reflecting mirror M connected with the rod 530, and reciprocate along with the guide 510, thereby tilting the reflecting mirror M.

The rotating drive 100, the mirror holder 200, the cam 400, and the tilting drive 500 are supported through a frame 570.

A structure in which the reflecting mirror can be rotated and tilted will be described with reference to FIG. 8.

Figure 8A:
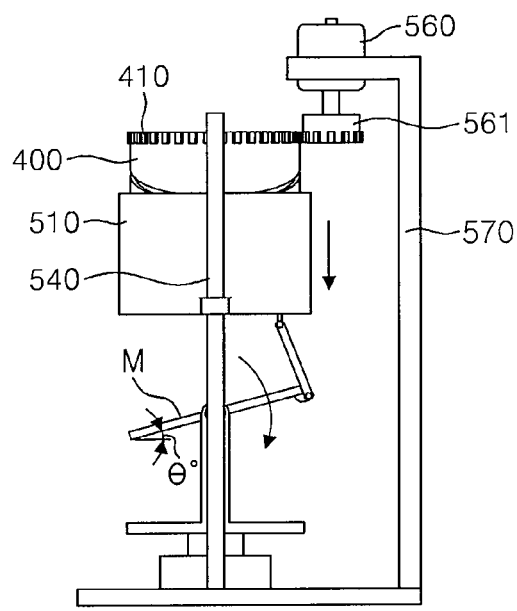
FIGS. 8A to 8C are schematic views illustrating step-by-step operation of the three-dimensional space scanner illustrated in FIG. 6.
Figure 8B:
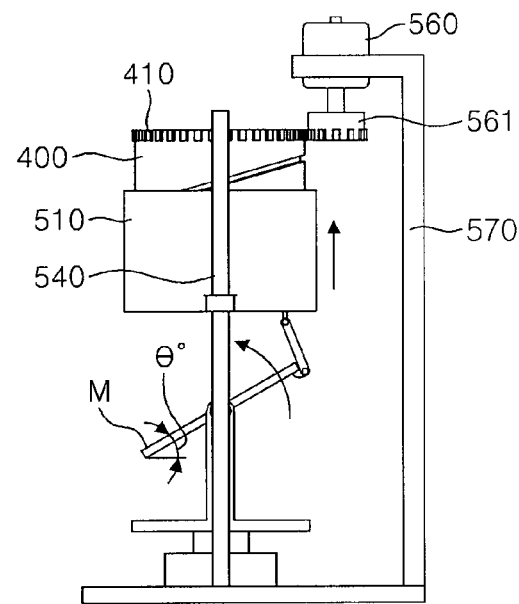
Figure 8C:
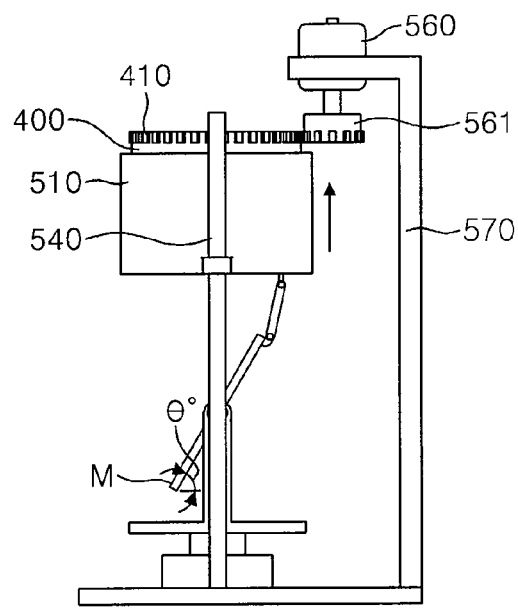

FIGS. 8A through 8C are schematic views illustrating step-by-step operation of the three-dimensional space scanner illustrated in FIG. 6.

As illustrated in FIG. 8A, when the cam 400 is rotated in a predetermined direction, the guide 510 moves downward along the guide groove 420 of the cam 400, and then is located at the lowermost position of a moving path of the tilting drive 500.

At this time, the reflecting mirror M is pushed in a downward direction by the rod 530, so that the reflecting mirror M has a gradient θ of 45° or less with respect to a horizontal plane.

Next, as illustrated in FIG. 8B, when the cam 400 is rotated, the guide 510 moves upward along the guide groove 420 of the cam 400, and then is located at an intermediate position of the moving path of the tilting drive 300.

At this time, the reflecting mirror M is pushed in an upward direction by the rod 530, so that the reflecting mirror M has a gradient θ of about 45° with respect to a horizontal plane.

Finally, as illustrated in FIG. 8C, when the cam 400 is rotated, the guide 510 further moves upward along the guide groove 420 of the cam 400, and then is located at the uppermost position of the moving path of the tilting drive 500.

At this time, the reflecting mirror M is further pushed in an upward direction by the rod 530, so that the reflecting mirror M has a gradient θ of 45° or more with respect to a horizontal plane.

The lowermost and uppermost positions of the tilting drive 500 can be adjusted according to the tilting range of the reflecting mirror. Thus, the lowermost and uppermost positions of the tilting drive 300 are determined so as to be located above the mirror holder 200 such that the tilting drive 300 does not move below the mirror holder 200.

This tilting motion of the reflecting mirror M is repeatedly performed by the continuous rotation of the cam 400 within a gradient range of $0°<θ<90°$. The gradient range can be adjusted by adjusting a length of the rod 530.

Further, the rotation of the reflecting mirror M can be synchronized with the continuous rotation of the vertical rotating shaft 102.

In this manner, the reflecting mirror is not fixed at an angle of 45° as in the prior art, and thus is able to obtain spatial data by scanning information about various angles through a tiltable structure.

While the present invention has been shown and described in connection with the exemplary embodiments, it will be apparent to those skilled in the art that modifications and variations can be made without departing from the spirit and scope of the invention as defined by the appended claims.

What is claimed is:

1. A three-dimensional space scanner, comprising:
    a rotating drive generating a rotating force;
    a mirror holder tiltably supporting a reflecting mirror and rotated by the rotating force of the rotating drive; and
    a tilting drive disposed above the mirror holder, wherein the tilting drive vertically reciprocates along a frame and tilts the reflecting mirror connected via a rod.

2. The three-dimensional space scanner of claim 1, wherein the rod is hinged with a first end of the reflecting mirror, and the reflecting mirror is tilted depending on a vertical displacement of the tilting drive.

3. The three-dimensional space scanner of claim 2, wherein the reflecting mirror has a tilting range determined by a vertical displacement of the rod.

4. The three-dimensional space scanner of claim 1, wherein the reflecting mirror has a tilting range determined by a vertical displacement of the rod.

5. The three-dimensional space scanner of claim 1, wherein the tilting drive includes:
    an outer plate having a through-hole in a center thereof, wherein the outer plate vertically reciprocates along a guide slot of the frame;
    an inner plate having a through-hole in a center thereof, which allows a laser beam to pass through, and rotatably inserted into the through-hole of the outer plate; and
    the rod hinged with the inner plate at one end thereof and the reflecting mirror at the other end thereof.

6. The three-dimensional space scanner of claim 5, wherein the inner plate and the rod are rotated in the through-hole of the outer plate, and vertically reciprocate along with the outer plate.

7. A three-dimensional space scanner, comprising:
    a rotating drive generating a rotating force;
    a mirror holder tiltably supporting a reflecting mirror and rotated by the rotating force of the rotating drive;
    a cam having a guide groove in an outer circumferential surface thereof and rotatably disposed above the mirror holder; and
    a tilting drive connected with the guide groove, wherein the tilting drive vertically reciprocates along a path of the guide groove and tilts the reflecting mirror connected via a rod.

8. The three-dimensional space scanner of claim 7, further comprising a cam motor providing a driving force for rotating the cam.

9. The three-dimensional space scanner of claim 7, further comprising a frame supporting the rotating drive, the mirror holder, the cam, and the tilting drive.

10. The three-dimensional space scanner of claim 7, wherein the rod is hinged with one end of the reflecting mirror, and the reflecting mirror is tilted depending on a vertical displacement of the tilting drive.

11. The three-dimensional space scanner of claim 10, wherein the reflecting mirror has a tilting range determined by a vertical displacement of the rod.

12. The three-dimensional space scanner of claim 7, wherein the reflecting mirror has a tilting range determined by a vertical displacement of the rod.

13. The three-dimensional space scanner of claim 7, wherein the tilting drive includes:
    a guide having a cam follower on an inner circumferential surface thereof which is fitted into the guide groove, wherein the guide vertically reciprocates along a path of the guide groove;
    a plate having a through-hole in a center thereof, which allows a laser beam to pass through, and rotatably coupled with the guide; and
    the rod hinged with the plate at one end thereof and the reflecting mirror at the other end thereof.

14. The three-dimensional space scanner of claim 13, wherein the plate is rotatably inserted into a groove recessed along an inner circumferential surface of a lower end of the guide.

15. The three-dimensional space scanner of claim 13, wherein the guide has a cylindrical structure in which an inner diameter thereof is greater than an outer diameter of the cam, and vertically reciprocates along a length of the cam.

16. The three-dimensional space scanner of claim 13, wherein the rod vertically reciprocates to tilt the reflecting mirror.

* * * * *